United States Patent Office 2,912,363
Patented Nov. 10, 1959

2,912,363

FUMARIC ACID FERMENTATION PROCESS

Earl G. La Roe, Cincinnati, Ohio, assignor to National Distillers and Chemical Corporation, New York, N.Y., a corporation of Virginia No Drawing. Application November 28, 1955
Serial No. 549,538

6 Claims. (Cl. 195—36)

The present invention relates to an improved process for the production of fumaric acid from various carbohydrates and carbohydrate-containing substances by means of fumaric acid-producing fungi.

It is known that fumaric acid can be produced from a variety of carbohydrate substances by means of certain fungi; for example, in Patent Nos. 2,327,191 and 2,326,896, processes are disclosed whereby fermentable carbohydrate solutions containing suitable nutrient materials are fermented by fumaric acid-producing fungi to produce fumaric acid or, when carried out in the presence of a suitable neutralizing agent, to produce salts of fumaric acid. As disclosed therein, fungi belonging to the genus Rhizopus, including *Rhizopus nigricans*, are useful for such a purpose as are certain other organisms belonging to the order Mucorales such as species of Mucor, Cunninghamella and Circinella. Still other fungi contemplated for such usage include some fumaric acid-producing Aspergilli and other strains belonging to the genus Rhizopus and including *Rhizopus oryze* and *Rhizopus arrhizus*. Thus, it is known that numerous fungi possess the capacity to form fumaric acid by fermentation of carbohydrate solutions whereby, as used herein, the term "fumaric acid-producing fungi" is intended to include fumaric acid producing organisms as set forth hereinbefore as well as other organisms which, though not specifically referred to herein, also possess the capacity to produce fumaric acid by fermentation of a variety of fermentable carbohydrate-containing substances including sugars, starches and their derivatives; more specifically, glucose, fructose, sucrose, invert sugar, maltose, invert high test molasses, syrups, and various starches, grains, malted grains, cereal products and other materials containing any of the foregoing substances.

In carrying out the process for fermentation of fermentable carbohydrates by means of fumaric acid-producing fungi, the fermentation (i.e., the fumaric acid production stage) is carried out in presence of suitable nutrient materials and, if necessary or otherwise desired, in presence of other materials and illustrative of which are salts of iron to stimulate the production of fumaric acid. For example, and for use as nutrients in the production stage, salts of potassium, salts of magnesium and nitrogen-containing substances may suitably be employed in various combinations and concentrations with a typical nutrient composition being composed of potassium acid phosphate, magnesium sulfate and ammonium sulfate. With respect to the nitrogen-containing nutrient, ammonium sulfate is particularly suitable but other nitrogen-containing substances may be employed and illustrative of which are urea, ammonium nitrate, ammonium chloride, aqueous ammonia, and the like.

In such processes for production of fumaric acid, a desiderata is the obtainment of fumaric acid in increased yields particularly when carrying out the fermentation under standardized specified conditions, and, in certain instances, even relatively small increases in yield are of considerable importance in rendering a particular process more feasible economically or conversion of an otherwise uneconomical process to one that is commercially practicable. The primary object of this invention is the provision of a process for production of fumaric acid by means of fumaric acid-producing fungi whereby substantially increased yields of fumaric acid are obtained.

The process of the present invention comprises the production of fumaric acid by fermentation of a fermentable carbohydrate by means of fumaric acid-producing fungi in the presence of a nitrogen-containing nutrient at the beginning of the fermentation and addition of a nitrogen-containing nutrient as an increment or plurality of increments during a subsequent stage or stages of the fermentation. It has been found, as is more clearly described hereinafter, that by such incremental supply of nitrogen-containing nutrient during the production stage for fumaric acid by means of fumaric acid-producing fungi, the yield of fumaric acid is substantially improved over the yields of fumaric acid obtained by carrying out the fermentation in similar or identical manner with the exception that all of the nitrogen-containing nutrient is supplied to the fermentation process at the initial stage thereof.

Generally speaking, the total amount of nitrogen normally required as a nutrient in fumaric acid-producing processes as aforedescribed may be varied depending on factors such as the particular carbohydrate or carbohydrate-containing substances subjected to the fermentation treatment, the presence of particular metallic ions in the fermentation medium, and the like, but usually the fermentation may suitably be carried out by use of a nitrogen containing nutrient in a ratio of one part of nitrogen to from about 25 to about 300 parts of carbohydrate (as carbon). Thus, as applied to fermentation of carbohydrate materials by means of fumaric acid-producing fungi for production of fumaric acid under standardized conditions including temperature and ingredients of the fermentation medium, the amount of total nitrogen required as a nutrient for carrying out the fermentation to optimum yields of fumaric acid can be determined by carrying out a series of such fermentations with addition, to the production medium, of varying amounts of nitrogen at the start of the fermentation and determination of the amount of total nitrogen that produces optimum or substantially optimum yields of fumaric acid under the conditions employed.

As aforesaid, and in accordance with this invention, it has been found that, in carrying out a fermentation process as aforedescribed under otherwise identical or similar conditions, substantially improved yields of fumaric acid can be obtained if the fermentation is carried out by incremental addition of the nitrogen-containing nutrient, rather than by having all of the nitrogen nutrient to be utilized in the fermentation present at the beginning of the fermentation. More specifically, and in preferred aspects of the invention, the fermentation process as embodied herein is carried out by having present, at the beginning of the fermentation, from about 10 to about 75% of the defined amount of nitrogen-containing nutrient that is to be utilized in the fermentation process with the remainder being supplied to the fermentation medium as an increment or plurality of increments during a subsequent stage or stages of the fermentation process. Still more specifically, the fermentation process embodied herein is carried out by having present in the fermentation medium, at the initial stage of the fermentation, from about 20 to about 70% of the total amount of nitrogen-containing nutrient to be supplied to the fermentation process with the remainder of the nitrogen-containing nutrient being supplied as a plurality of increments during subsequent stages of the fermentation.

In order to illustrate practice of the invention, specific embodiments thereof are set forth hereinafter in which the fermentable carbohydrate employed was an inverted high test molasses, the fumaric acid-producing fungus was a culture of the genus Rhizopus and the nitrogen-containing nutrients were ammonium sulfate and urea. Although such specific materials have been utilized in the described embodiments, it should be understood that their usage is for the purpose of illustrating but not limiting the invention thereto.

PREPARATION OF FUMARIC ACID-PRODUCING FUNGUS

A culture of Rhizopus species (strain of *Rhizopus oryzae*) was grown for 24 hours at 30° C. with shaking (i.e., submerged culture) in an aqueous medium of the following composition (grams/100 ml.):

| | |
|---|---|
| Invert sugar | 4.0 |
| Calcium carbonate | 0.6 |
| Ammonium sulfate | 0.2 |
| Magnesium sulfate heptahydrate | 0.05 |
| Potassium acid phosphate | 0.05 |
| Zinc sulfate heptahydrate | 0.0004 |
| Ferric sulfate | 0.0004 |

*Example I.—Preparation of fermentation medium*

A fermentation medium was prepared by inoculating, with 10.5 mls. of the culture of Rhizopus species obtained as aforedescribed, a production substrate prepared as follows: Fifteen grams of invert sugar (produced by enzymatic or acid inversion of high test molasses), 9.75 grams of calcium carbonate, 0.0375 gram of magnesium sulfate heptahydrate, 0.15 gram of potassium acid phosphate, 1.5 mgs. of ferric sulfate and sufficient water to make 140 mls. were mixed in a 500 ml. Erlenmeyer flask and the contents of the flask were sterilized. The fermentation medium, prepared as aforedescribed, was fermented with agitation for a period of 7 days at 28 to 32° C. As is set forth in the following tabulation, in some instances the fermentation was carried out with all of the nitrogen-containing nutrient (ammonium sulfate) being present at the beginning of the fermentation and, in other instances, in the presence of only a portion of the nitrogen-containing nutrient at the beginning of the fermentation with addition of the remainder of the nitrogen-containing nutrient at a subsequent stage or stages of the fermentation. The following tabulation sets forth the yield of fumaric acid obtained by carrying out the fermentation by incremental addition of the nitrogen-containing nutrient during the fermentation as compared to the results obtained by carrying out the fermentation under identical conditions except that all of the nitrogen-containing nutrient was present at the initial stage of the fermentation:

| Run No. | Ammonium Sulfate Added, Percent [1] | | | | | Yield of Fumaric Acid, Percent [2] |
|---|---|---|---|---|---|---|
| | Initial | 24 hrs. | 48 hrs. | 72 hrs. | 96 hrs. | |
| 1 | 0.18 | | | | | 43.9 |
| | 0.12 | | 0.06 | | | 45.1 |
| | 0.06 | | 0.12 | | | 46.3 |
| | 0.06 | | 0.06 | | 0.06 | 49.2 |
| 2 | 0.20 | | | | | 38 |
| | 0.05 | 0.05 | 0.05 | 0.05 | | 49.1 |
| | 0.25 | | | | | 36.0 |
| 3 | 0.05 | 0.05 | 0.05 | 0.05 | 0.05 | 49.1 |

[1] Based on weight of aqueous fermentation medium.
[2] Based on amount of sugar present at beginning of fermentation.

*Example II*

In the following tabulation, data are set forth resulting from practice of the invention with use of urea as the nitrogen-containing nutrient. For such an embodiment, the fumaric acid-producing fungus was prepared as aforedescribed and used to inoculate a production substrate prepared as follows: Fifteen grams of invert sugar (produced by enzymatic or acid conversion of high test molasses), 9.75 grams of calcium carbonate, 0.375 gram of magnesium sulfate heptahydrate, 0.135 gram of potassium acid phosphate, 3.0 mgs. of ferric sulfate and sufficient water to make 140 mls. were mixed in a 500 ml. Erlenmeyer flask and the contents of the flask were sterilized. The fermentation was carried out in the manner described in Example I with addition of urea at the stages of the fermentation set forth in the following tabulation:

| Run No. | Urea Added, Percent [1] | | | | Yield of Fumaric Acid, Percent [2] |
|---|---|---|---|---|---|
| | Initial | 24 hrs. | 48 hrs. | 96 hrs. | |
| 4 | 0.06 | | | | 43.2 |
| 5 | 0.02 | 0.02 | 0.02 | | 48.2 |
| 6 | 0.02 | | 0.02 | 0.02 | 50.4 |

[1] Based on weight of aqueous fermentation medium.
[2] Based on amount of sugar present at beginning of fermentation.

As is apparent from the data in the foregoing tabulations, in each instance wherein the nitrogen-containing nutrient was added in increments as embodied herein, the yield of fumaric acid was increased as compared to the yield of fumaric acid obtained from carrying out the fermentation under identical conditions with the exception that the same total amount of nitrogen-containing nutrient was present at the initial stage of the fermentation.

In practice of the invention, the fermentation process is carried out at temperatures that usually may range from about 28 to about 34° C. with a temperature of about 28° C. being particularly suitable. However, the temperature utilized may be varied to those somewhat lower or higher than the aforesaid range depending on factors such as the specific fungus employed in the production medium as well as on the other ingredients and concentrations thereof present in the particular fermentation medium employed. Moreover, and in accordance with conventional practice, the fermentation process as embodied herein may be carried out in the presence of a suitable neutralization agent whereby the fumaric acid that forms during the fermentation is neutralized so as to provide for more rapid conversion of the fermentable substances to fumaric acid. For such usage neutralizing agents such as calcium carbonate, sodium or potassium hydroxides, etc. are suitable.

As is apparent from the foregoing description, the invention embodied herein is directed to an improvement in the fumaric acid-producing stage, as distinguished from the fungus growth stage, in fumaric acid-producing processes by fermentation of fermentable carbohydrates, such as sugar solutions, by means of fumaric acid-producing fungi. Hence, in practice of the invention, it may be carried out without limitation as to the particular method employed for preparation of the fumaric acid-producing fungi. For example, the fungus utilized in practice of this invention may be prepared by growing the culture in presence of certain carbohydrate materials such as invert molasses, black strap molasses, etc. that contain growth stimulating substances or by growing the culture in sugar solution, such as glucose, sugar syrup, etc. to which growth stimulants are added, such for example, as disclosed in Patent No. 2,326,986. Moreover, and as to the preparation of the organisms for inoculation of the fermentation medium, the inoculum may be produced in a single growth stage or a plurality of growth stages. For example, the organisms may be grown in a single stage as is illustrated by the procedure used in preparation of the Rhizopus species described in the embodiment herein or the organisms may be grown in a plurality of stages. In illustration of the latter method for preparation of an inoculum, a sporulated culture of a suitable fumaric acid-producing strain of Rhizopus on a liquid or solid growth medium is used to seed a liquid growth substrate of suitable composition. After incubation under conditions of agitation and at a suitable temperature, and with provisions for aeration of the substrate, the submerged culture of the fungus is developed into a dispersed, filamentous mass whereby the culture is capable of producing fumaric acid when inoculated to a production substrate. However, a number of subcultures or serial transfers of the primary submerged inoculum may be prepared in media of similar or identical composition. For example, a submerged fugus culture grown in aforedescribed manner may be inoculated into a liquid growth substrate. After sufficient incubation at a temperature between 28–34° C. with provisions for aeration and agitation the resultant filamentous mass of fungus is again suitable for use in production of fumaric acid when inoculated to a production substrate. A third or fourth stage inoculum may then be prepared in a similar manner by increasing, decreasing or holding constant the volume of substrate. By increasing the volume of substrate stepwise and employing the previous stage of inoculum so that the inoculation constitutes between 0.5 and 25 percent of the total stage volume, such a procedure may be used to build up a sufficient amount of submerged fungus mycelium for large scale fermentation.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for production of fumaric acid by fermentation of a carbohydrate-containing substance by means of a fumaric acid-producing fungi of the genus Rhizopus in the presence of a nitrogen-containing nutrient, the improvement which comprises initiating the fermentation in the fermentation medium containing substantially all of the carbohydrate-containing solution to be fermented but only from about 10 to about 75% by weight of the required amount of nitrogen-containing nutrient, and adding the remainder of said required nitrogen-containing nutrient during the course of the fermentation.

2. A process, as defined in claim 1, wherein the fumaric acid-producing fungi is an organism of the strain of *Rhizopus oryzae*.

3. A process, as defined in claim 1, wherein the nitrogen-containing nutrient is a member from the group consisting of ammonium sulfate and urea.

4. A process, as defined in claim 1, wherein the fumaric acid-producing fungi is an organism of the strain of *Rhizopus oryzae* and the nitrogen-containing nutrient is a member from the group consisting of ammonium sulfate and urea.

5. A process, as defined in claim 1, wherein the fermentation is initiated in the presence of from about 20 to about 70% by weight of the required total amount of the nitrogen-containing nutrient.

6. In a submerged culture process for productiton of fumaric acid by fermentation of a carbohydrate-containing substance by means of an organism of the strain of *Rhizopus oryzae* in presence of a required amount of a nitrogen-containing nutrient within the range of one part of nitrogen per twenty five to three hundred parts of the carbohydrate (as carbon), the improvement which comprises initiating the fermentation in the presence of substantially all of the carbohydrate-containing substance but only from about 10 to about 75% by weight of the total required amount of the nitrogen-containing nutrient, and adding the remainder of said required nitrogen-containing nutrient during the course of the fermentation.

References Cited in the file of this patent

UNITED STATES PATENTS

| | | |
|---|---|---|
| 1,936,983 | Lilly | Nov. 28, 1933 |
| 2,097,292 | Kitzmeyer | Oct. 26, 1937 |
| 2,132,712 | Ward | Oct. 11, 1938 |
| 2,326,986 | Waksman | Aug. 17, 1943 |
| 2,327,191 | Kane et al. | Aug. 17, 1943 |

OTHER REFERENCES

Foster, J. W.: Bacterial Rev., 5 (1947), page 167.

Underkoffler et al.: Industrial Fermentations, vol. 1, 1954, Chemical Pub. Co., Inc., 212 Fifth Avenue, New York, N.Y., pages 476, 477.